US012601417B2

(12) United States Patent
Kodama

(10) Patent No.: US 12,601,417 B2
(45) Date of Patent: Apr. 14, 2026

(54) VALVE AND FLUID CONTROL DEVICE

(71) Applicant: MURATA MANUFACTURING CO., LTD., Kyoto (JP)

(72) Inventor: Yukiharu Kodama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 120 days.

(21) Appl. No.: 18/820,944

(22) Filed: Aug. 30, 2024

(65) Prior Publication Data

US 2024/0426389 A1 Dec. 26, 2024

Related U.S. Application Data

(63) Continuation of application No. PCT/JP2023/007846, filed on Mar. 2, 2023.

(30) Foreign Application Priority Data

Mar. 4, 2022 (JP) ................................. 2022-033147

(51) Int. Cl.
*F16K 15/14* (2006.01)
*F16K 27/02* (2006.01)

(52) U.S. Cl.
CPC ........ *F16K 27/0236* (2013.01); *F16K 15/144* (2013.01)

(58) Field of Classification Search
CPC ............... F16K 15/144; F16K 15/1402; F16K 27/0236; F04B 43/023; F04B 43/028; F04B 43/046; F04B 45/043; F04B 45/045; F04B 45/047; F04B 45/10
See application file for complete search history.

(56) References Cited

U.S. PATENT DOCUMENTS

| 9,631,730 B2 * | 4/2017 | Kotani | ................. | F16K 31/1266 |
| 9,879,669 B2 * | 1/2018 | Kawamura | ............... | F16K 7/12 |
| 10,569,076 B2 * | 2/2020 | Kurihara | ............... | F16K 17/164 |

(Continued)

FOREIGN PATENT DOCUMENTS

| WO | 2012/023396 A1 | 2/2012 |
| WO | 2012/141113 A1 | 10/2012 |

(Continued)

OTHER PUBLICATIONS

International Search Report for PCT/JP2023/007846 dated Apr. 25, 2023.

*Primary Examiner* — Hailey K. Do

(74) *Attorney, Agent, or Firm* — McDonald Hopkins LLC

(57) ABSTRACT

A valve includes a housing, a hole, a hole, a diaphragm, a seat, and a protrusion. The housing includes a housing member and a flat board that oppose each other, and a side wall connected to the housing member and the flat board, the side wall being capable of defining a valve chamber together with the housing member and the flat board. The hole is formed in the flat board, and connects the valve chamber and an outside of the valve to each other. The hole is formed in the housing member, and connects the valve chamber and the outside of the valve to each other. The diaphragm divides the valve chamber into a first space nearer the flat board and a second space nearer the housing member, and has a through-hole that allows the first space and the second space to communicate with each other.

20 Claims, 7 Drawing Sheets

(56) References Cited

U.S. PATENT DOCUMENTS

| | | | | |
|---|---|---|---|---|
| 10,781,808 B2 * | 9/2020 | Kawamura | .......... | A61B 5/0235 |
| 11,293,427 B2 * | 4/2022 | Kawamura | .............. | F16K 7/17 |
| 12,398,814 B2 * | 8/2025 | Kodama | ............. | F16K 15/1402 |

FOREIGN PATENT DOCUMENTS

| | | | |
|---|---|---|---|
| WO | 2016/194564 | A1 | 12/2016 |
| WO | 2017/195475 | A1 | 11/2017 |
| WO | 2018/021099 | A1 | 2/2018 |
| WO | 2020/084978 | A1 | 4/2020 |

* cited by examiner

VALVE AND FLUID CONTROL DEVICE

CROSS REFERENCE TO RELATED APPLICATION

This is a continuation of International Application No. PCT/JP2023/007846 filed on Mar. 2, 2023 which claims priority from Japanese Patent Application No. 2022-033147 filed on Mar. 4, 2022. The contents of these applications are incorporated herein by reference in their entireties.

BACKGROUND OF THE DISCLOSURE

Field of the Disclosure

The present disclosure relates to a valve that regulates the flow of a fluid using a diaphragm, and a fluid control device including the valve.

Description of the Related Art

Patent Documents 1 and 2 each describe a fluid control device including a piezoelectric pump and a check valve (valve). The valve has a housing including a first wall and a second wall that oppose each other. The first wall has a first hole. The second wall has a second hole and a third hole. The first hole communicates with a piezoelectric pump. The second hole communicates with a cuff outside the fluid control device. The third hole is used for discharge, and communicates with the outside of the housing of the valve.

A diaphragm (film) is installed in the housing. The diaphragm separates the internal space in the housing into a space nearer a first wall and a space nearer a second wall.

The diaphragm is deformed with the flow of a fluid, to switch the flow (a first flow) of the fluid (for example, a gas) from a vent to a communicating hole to the flow (a second flow) of the fluid from the communicating hole to an outlet hole.

More specifically, the diaphragm has a through-hole. The first wall includes a seat. When the valve is viewed in a plan, the through-hole in the diaphragm and the seat overlap.

With the first flow, the diaphragm moves away from the seat. Thus, the fluid that has flowed in through the first hole is ejected from the second hole through the through-hole in the diaphragm. With the second flow, the diaphragm comes into contact with the surface of the seat. Thus, the fluid that has flowed in through the second hole is discharged from the third hole.

Patent Document 1: International Publication No. 2017/195475

Patent Document 2: International Publication No. 2018/021099

BRIEF SUMMARY OF THE DISCLOSURE

However, in the fluid control devices described in Patent Documents 1 and 2, foreign substances in the housing or foreign substances that have flowed into the housing in the first flow may get caught between the diaphragm and the seat.

A possible benefit of the present disclosure is to provide a structure of a valve that reduces foreign substances that get caught between a diaphragm and a seat.

The valve according to the present disclosure includes a housing, a first hole, a second hole, a diaphragm, a seat, and a protrusion. The housing includes a first wall and a second wall that oppose each other, and a side wall that is connected to the first wall and the second wall, and that is capable of defining a valve chamber together with the first wall and the second wall. The first hole is formed in the first wall, and connects the valve chamber and an outside to each other. The second hole is formed in the second wall, and connects the valve chamber and an outside to each other. The diaphragm divides the valve chamber into a first space nearer the first wall and a second space nearer the second wall, and has a through-hole that allows the first space and the second space to communicate with each other. The seat protrudes into the valve chamber from the first wall, and is disposed to overlap the through-hole when the valve is viewed in a plan from the first wall to the second wall in a first direction. The protrusion is disposed between the first hole and the seat when the valve is viewed in a cross section taken in a second direction perpendicular to the first direction, and disposed on the diaphragm or the first wall in the first space.

In this structure, the protrusion is located in a flow path from the first hole to the seat and a film through-hole. Thus, foreign substances (such as solid bodies) that have flowed in through the first hole, and foreign substances located nearer the first hole than the protrusion hit against the protrusion when the fluid flows into the film through-hole from the first hole. This structure hinders the arrival of foreign substances at the seat and the film through-hole.

The present disclosure can reduce foreign substances that get caught between the diaphragm and the seat.

DETAILED DESCRIPTION OF THE DISCLOSURE

First Embodiment

Figures 1, 2:
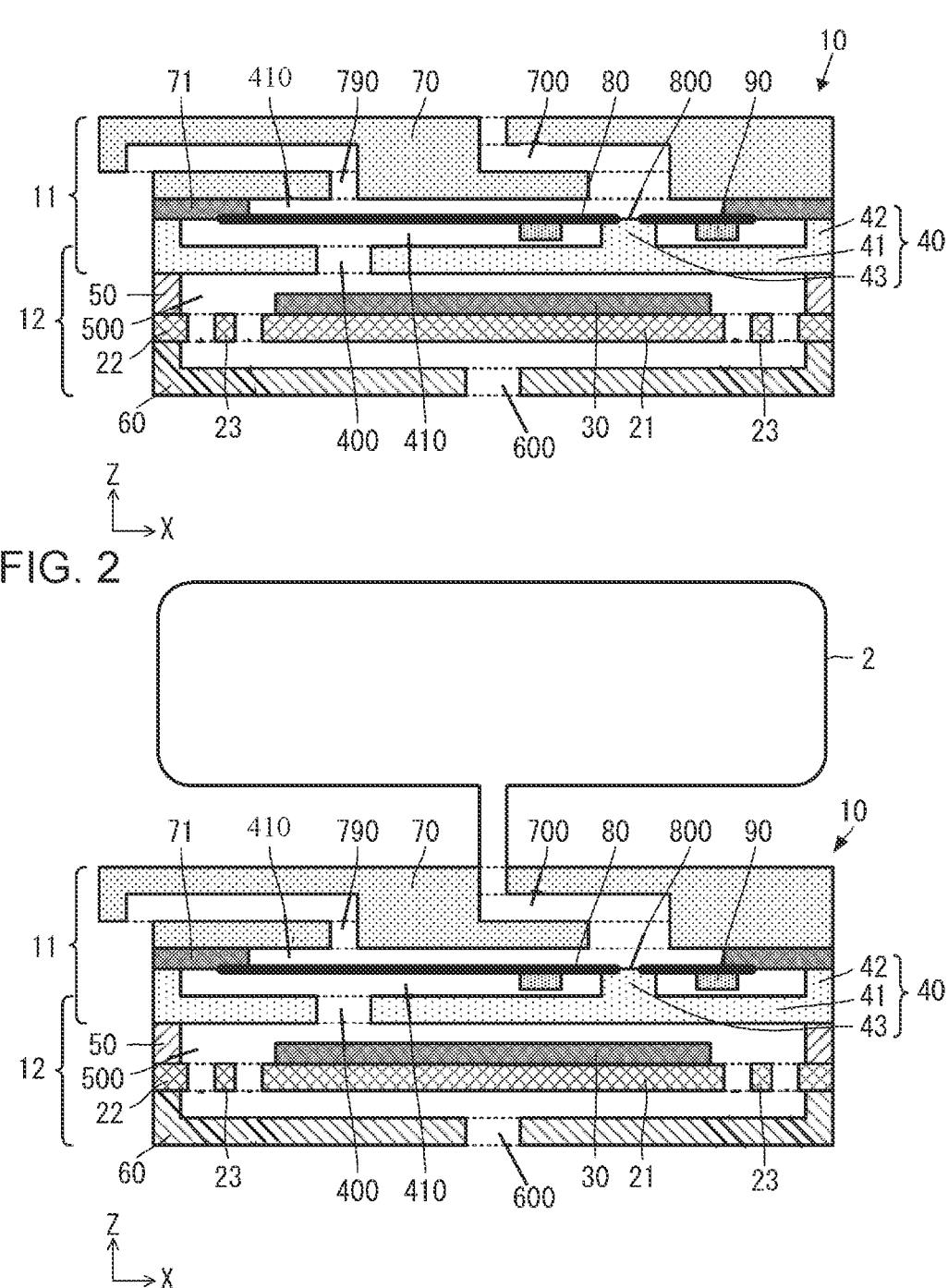
FIG. 1 is a schematic cross-sectional view, viewed from a side, of the structure of a fluid control device according to a first embodiment.
FIG. 2 is a diagram of the fluid control device according to the first embodiment to which a cuff is attached.
Figure 3A:
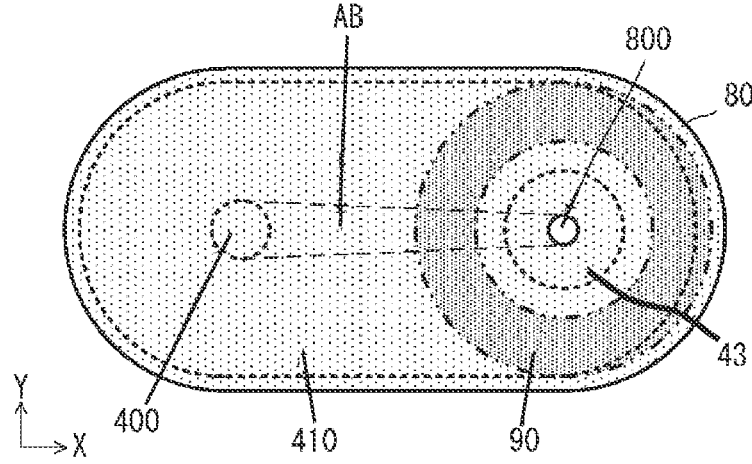
FIG. 3A and FIG. 3B are partially enlarged plan views of the valve, at a portion including a seat and a diaphragm.
Figure 3B:
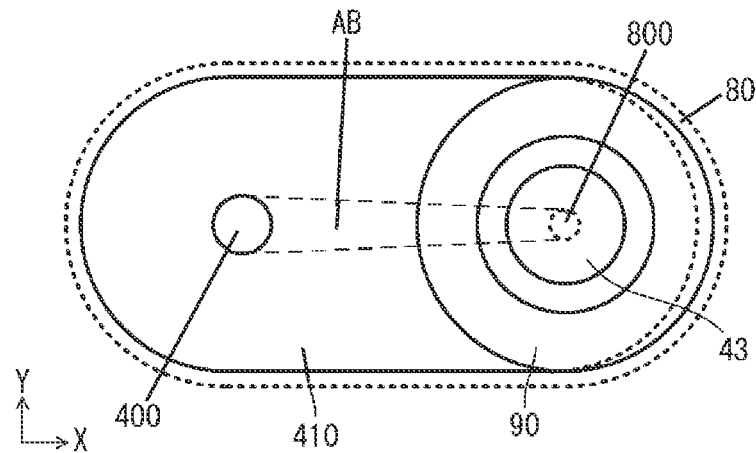
Figure 3C:
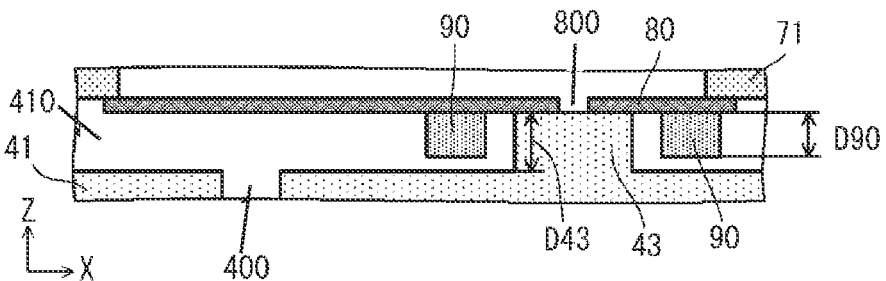
FIG. 3C is a cross-sectional view, viewed from a side, of the portion.

A valve and a fluid control device according to a first embodiment of the present disclosure are described with reference to the drawings. FIG. 1 is a schematic cross-sectional view, viewed from a side, of the structure of a fluid control device according to a first embodiment. FIG. 2 is a diagram of the fluid control device according to the first embodiment to which a cuff is attached. FIG. 3A and FIG. 3B are partially enlarged plan views of the valve, at a portion including a seat and a diaphragm, and FIG. 3C is a cross-sectional view, viewed from a side, of the portion. FIG. 3B illustrates a state where the diaphragm in FIG. 3A is removed.

In embodiments including the present embodiment, the drawings illustrate the shape of each component partially or entirely exaggerated for ease of understanding the structures of the valve and the fluid control device. In addition, although a gas (such as air) is described below as an example of a fluid, the structure of the present disclosure is applicable to other fluids, including a gas other than air.

As illustrated in FIG. 1 and FIG. 2, a fluid control device 10 includes a valve 11 and a pump 12. The valve 11 and the pump 12 are integrated while sharing components. As illustrated in FIG. 2, a cuff 2 is connected to the valve 11. The cuff 2 corresponds to "a component to which a fluid is ejected" in the fluid control device 10.

Valve 11

The valve 11 includes a housing member 40, a housing member 70, a retainer plate 71, a diaphragm 80, and a protrusion 90.

The housing member 40 includes a flat board 41, a side wall 42, and a seat 43, and is formed from, for example, metal or resin.

The flat board 41 has a hole 400. The hole 400 extends through the flat board 41 in a thickness direction, and has an opening open in a first main surface of the flat board 41 and an opening open in a second main surface of the flat board 41. The flat board 41 corresponds to "a first wall" in the present disclosure.

The side wall 42 is connected to the outer edge of the flat board 41. The side wall 42 has a shape of protruding from the first main surface of the flat board 41. The flat board 41 and the side wall 42 may be integrated, or separately formed and then joined to each other.

The seat 43 protrudes from the first main surface of the flat board 41. The seat 43 is located at a position different from the hole 400. The seat 43 is, for example, cylindrical.

The housing member 70 has a plate-like shape, and is formed from a material such as metal or resin. When viewed in a plan, the housing member 70 has a shape substantially the same as that of the housing member 40. The housing member 70 corresponds to "a second wall" in the present disclosure.

The housing member 70 has a hole 700 and a hole 790. The hole 700 extends through the housing member 70 in the thickness direction, and has an opening open in the first main surface of the housing member 70, and an opening open in the second main surface of the housing member 70. The first end of the hole 790 is open in the second main surface of the housing member 70. The opening of the hole 700 and the opening of the hole 790 in the second main surface of the housing member 70 are spaced apart from each other. The second end of the hole 790 is open in the second main surface at a portion adjacent to the outer surface of the housing member 70. The second end of the hole 790 may be open in the side surface of the housing member 70.

The retainer plate 71 is formed from a material such as metal or resin. The retainer plate 71 is a frame. The retainer plate 71 may be integrated with the housing member 70.

The housing member 40 and the housing member 70 are combined with the retainer plate 71 interposed therebetween, and bonded or joined to each other. More specifically, the first main surface of the housing member 40 and the second main surface of the housing member 70 oppose each other. In other words, the housing member 40 is disposed to have the side wall 42 located nearer the housing member 70 than the flat board 41. The retainer plate 71 is in contact with the far end of the side wall 42 of the housing member 40, and in contact with the second main surface of the housing member 70. More specifically, the retainer plate 71 functions as a part of the first wall or the side wall of the housing in the present disclosure. In a plan view, the retainer plate 71 protrudes further inward beyond the inner wall surface of the side wall 42.

The valve 11 with this structure includes a valve chamber 410 defined by the housing member 40, the housing member 70, and the retainer plate 71. The valve chamber 410 communicates with the outside of the valve 11 at the first end surface of the valve 11 in a housing height direction through the hole 400. The hole 400 corresponds to "a first hole" in the present disclosure. The valve chamber 410 also communicates with the outside of the valve 11 at the second end surface of the valve 11 in the housing height direction through the hole 700. The hole 700 corresponds to "a second hole" in the present disclosure. The valve chamber 410 also communicates with the outside of the housing of the valve 11 through the hole 790.

In this structure, when the valve 11 is viewed in a plan, the seat 43 and the opening of the hole 700 open in the second main surface of the housing member 70 overlap. The opening area of the housing member 70 in the second main surface is greater than the area of the seat 43 viewed in a plan.

The hole 400 and the opening of the hole 790 in the second main surface of the housing member 70 may overlap, but this structure is not the only possible example.

The diaphragm 80 is formed from a deformable material such as a rubber sheet. The diaphragm 80 has a through-hole 800 near the outer edge. The through-hole 800 extends through the diaphragm 80 in the thickness direction. The through-hole 800 corresponds to "a through-hole" in the diaphragm in the present disclosure.

The diaphragm 80 is disposed between the housing member 70 and the flat board 41 in the housing member 40. An outer peripheral end portion of the diaphragm 80 is fixed to the retainer plate 71. More specifically, the diaphragm 80 is fixed to the housing of the valve 11 so that an area inward from the fixed outer peripheral end portion is deformable.

The diaphragm 80 arranged in this manner divides the valve chamber 410 into a first space between the diaphragm 80 and the flat board 41 in the housing member 40, and a second space between the diaphragm 80 and the housing member 70. The first space and the second space are connected to each other with the through-hole 800.

When the valve 11 is viewed in a plan, the through-hole 800 overlaps the seat 43. The opening area (two-dimensional area) of the through-hole 800 is smaller than the two-dimensional area of the seat 43.

The protrusion 90 is formed from a material such as metal or resin. The protrusion 90 has a ring shape in a plan view, and has a height D90. The height D90 of the protrusion 90 is shorter than a thickness (height) D43 of the seat 43. In other words, the protrusion 90 is thinner than the seat 43.

The protrusion 90 is in contact with and bonded to the surface of the diaphragm 80 facing the flat board 41. The protrusion 90 is disposed to allow the through-hole 800 to overlap (communicate with) the center opening of the protrusion 90 when the valve 11 (the diaphragm 80) is viewed in a plan. In addition, the protrusion 90 is disposed to allow the seat 43 to overlap the center opening of the protrusion 90 when the valve 11 is viewed in a plan. In other words, the seat 43 is disposed in the center opening of the protrusion 90. The protrusion 90 may be integrated with the diaphragm 80.

Operation of Valve 11

Figure 4A:
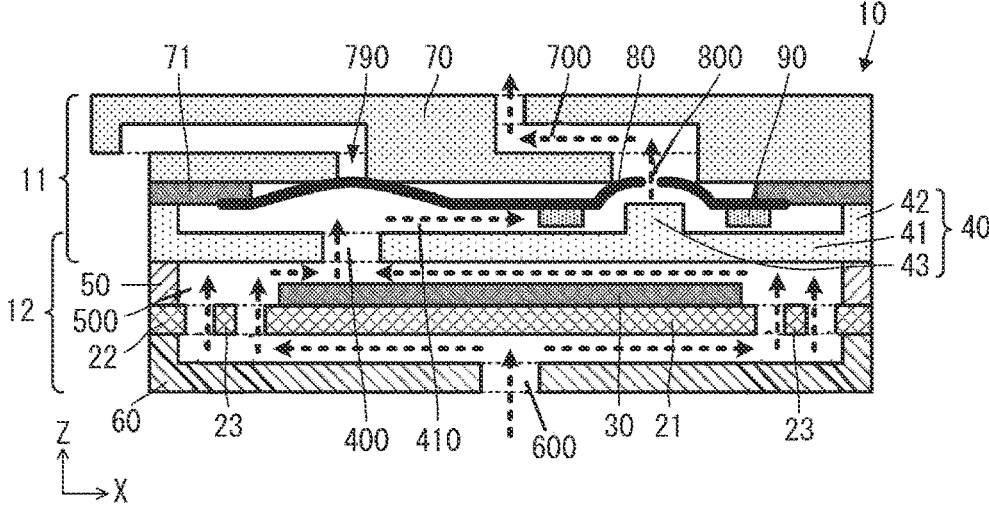
FIG. 4A and FIG. 4B are cross-sectional views, viewed from a side, of different forms of the flow of a fluid.
Figure 4B:
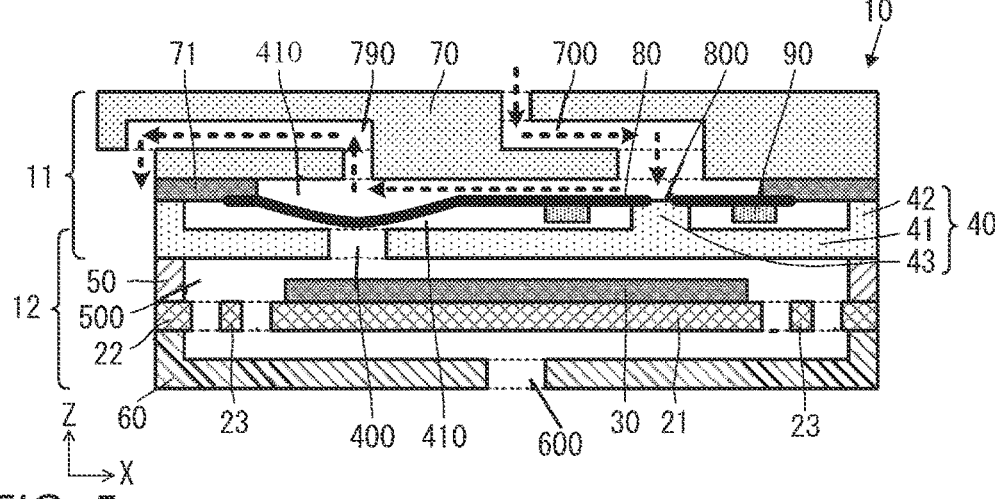

FIG. 4A and FIG. 4B are cross-sectional views, viewed from a side, of different forms of the flow of a fluid. In FIG. 4A and FIG. 4B, the bold dotted arrows indicate schematic flows of a fluid.

First Operation

A first operation is, for example, an operation of feeding a gas to the cuff 2.

In this case, the pump 12 described below is driven. When the pump 12 is driven, as illustrated in FIG. 4A, a gas flows from the pump 12 into the first space of the valve chamber 410 through the hole 400. The gas that has flowed in through the hole 400 presses the diaphragm 80. Thus, the diaphragm 80 is deformed to move away from the seat 43. Thus, the first space and the second space are connected to each other through the through-hole 800.

The gas that has flowed into the first space flows through the first space of the valve chamber 410 defined by the diaphragm 80, flows into the second space through the through-hole 800, and is then ejected from the second space through the hole 700 to the outside of the valve 11. The hole 700 communicates with the cuff 2, and the gas ejected to the outside of the valve 11 through the hole 700 is fed to the cuff 2.

The protrusion 90 is disposed in the gas flow path on the way from the hole 400 to the through-hole 800. Thus, the flow path has a shorter height at the position where the protrusion 90 is disposed. Thus, regardless of when a foreign substance (for example, a solid body) approaches the protrusion 90 in the gas flow path from the hole 400, the protrusion 90 hinders the arrival of the foreign substance at the through-hole 800. In other words, the foreign substance is more likely to be trapped by the protrusion 90.

More specifically, when the foreign substance is greater than the height of the flow path at the position where the protrusion 90 is disposed, the foreign substance collides against the protrusion 90, and fails to arrive at the through-hole 800. Even if the size of the foreign substance is less than or equal to the height of the flow path at the position where the protrusion 90 is disposed, the foreign substance collides against the protrusion 90, and is less likely to arrive at the through-hole 800. The valve 11 with this structure can thus reduce foreign substances that obstruct the through-hole 800.

The height (gap) of the flow path at the position where the protrusion 90 is disposed may be shorter than the maximum diameter (maximum dimension) of the through-hole 800. Thus, foreign substances of the size likely to obstruct the through-hole 800 do not pass the position where the protrusion 90 is disposed. Thus, the valve 11 with this structure can more reliably reduce foreign substances that obstruct the through-hole 800.

As described above, with the protrusion 90 that traps foreign substances during the first operation, the valve 11 can reduce the occurrence of failures resulting from foreign substances that obstruct the through-hole 800.

At this time, the diaphragm 80 is deformed to close the hole 790. Thus, the gas that has flowed into the second space from the through-hole 800 is ejected from the hole 700 without leaking into the hole 790. Thus, the gas can be efficiently fed to the cuff 2.

As described in embodiments described below, the protrusion 90 may have a shape other than a ring shape extending throughout the entire circumference. When the valve 11 is viewed in a plan, the protrusion 90 may have any shape that has a portion located in an area between the hole 400 and the through-hole 800 (an area indicated with an area AB in FIG. 3A and FIG. 3B). In this case, when the height D90 of the protrusion 90 is the same as the height D43 of the seat 43, the protrusion 90 can stop the movement of foreign substances. However, when the protrusion 90 has a shape extending throughout the entire circumference, the protrusion 90 can more reliably reduce foreign substances that arrive at the through-hole 800.

As illustrated in, for example, FIG. 1 or FIG. 2, the valve 11 may have a structure in which the retainer plate 71 and the protrusion 90 hold the diaphragm 80 therebetween. This structure reduces the separation of the diaphragm 80.

Second Operation

The second operation is, for example, an operation of discharging a gas from the cuff 2.

In this case, the pump 12, described below, is stopped. When the pump 12 is stopped, the pressure caused by the gas flowing into the cuff 2 ceases. Thus, the cuff 2 has a higher pressure than the valve chamber 410. The gas in the cuff 2 thus flows into the second space of the valve chamber through the hole 700. The gas that has flowed in through the hole 700 presses the diaphragm 80. Thus, the diaphragm 80 is deformed, and comes into contact with the seat 43. Thus, the through-hole 800 in the diaphragm 80 is closed by the surface of the seat 43, and the first space and the second space are specially separated.

The gas that has flowed in through the hole 700 presses the diaphragm 80. Thus, the diaphragm 80 is deformed, and the second space nearer the hole 790 is released.

With the above operation of the diaphragm 80, the gas that has flowed in through the hole 700 is discharged to the outside of the valve 11 through the hole 790.

The above structure reduces foreign substances that get caught between the diaphragm 80 and the seat 43 during the first operation. Thus, the valve 11 can reduce the occurrence of failures, such as a gas leakage into the first space, resulting from foreign substances getting caught between the diaphragm 80 and the seat 43 during the second operation.

When the height D90 of the protrusion 90 is shorter than the height D43 of the seat 43, the diaphragm 80 more reliably comes into contact with the surface of the seat 43. Thus, the through-hole 800 in the diaphragm 80 is more reliably closed by the surface of the seat 43. Thus, the valve 11 can more reliably discharge, through the hole 790, the gas that has flowed in from the cuff 2, more specifically, the gas that has flowed in through the hole 700.

Pump 12

As illustrated in FIG. 1 or FIG. 2, the pump 12 includes a main flat board 21, a frame 22, coupling members 23, a piezoelectric device 30, the flat board 41 of the housing member 40, a side wall member 50, and a lid member 60. The flat board 41 of the housing member 40 is shared between the valve 11 and the pump 12.

The main flat board 21 is circular in a plan view. The frame 22 is disposed to surround the main flat board 21. The multiple coupling members 23 have a beam shape, and are disposed between the main flat board 21 and the frame 22. The multiple coupling members 23 support the main flat board 21 while allowing the main flat board 21 to vibrate with respect to the frame 22.

The piezoelectric device 30 is circular in a plan view. The piezoelectric device 30 includes a piezoelectric body, and a driving conductor. The piezoelectric device 30 is disposed on the first main surface of the main flat board 21. The center of the piezoelectric device 30 and the center of the main flat board 21 agree with each other. Here, the agreement of the centers includes a range where the centers are displaced within the tolerance of manufacturing errors. The piezoelectric device 30 is deformed when receiving a driving voltage. The main flat board 21 vibrates with the stress caused by the deformation of the piezoelectric device 30.

The side wall member 50 has a ring shape having a hollow 500, and is disposed between the frame 22 and the housing member 40. The side wall member 50 is connected to the frame 22 and the housing member 40.

A space (the hollow 500) defined by a structure formed from the main flat board 21, the frame 22, and the coupling members 23, the housing member 40, and the side wall member 50 serves as a pump chamber for the pump 12.

The lid member 60 includes a flat board portion and a frame portion. The frame portion protrudes from the first main surface of the flat board portion. The flat board portion has a hole 600 extending through the flat board portion. The lid member 60 is disposed to cover the main flat board 21, and the frame portion of the lid member 60 is connected to the frame 22.

In this structure, when the main flat board 21 vibrates in the above manner, the gas is sucked into the pump 12 through the hole 600, and ejected into the valve chamber 410 for the valve 11 through the hole 400.

Structure of Fluid Control Device 10

When the valve 11 and the pump 12 have the above structures, the flat board 41 of the housing member 40 and the hole 400 are shared in the fluid control device 10, and the valve 11 and the pump 12 are formed by a single housing. Thus, the fluid control device 10 can achieve reduced thickness and reduced size.

The fluid control device 10 including the above valve 11 can reduce arrival, at the through-hole 800, of foreign substances located in the gas flow path nearer the pump 12 than the protrusion 90 in the valve 11. Thus, the fluid control device 10 can reduce the occurrence of the failures caused by the above foreign substances during the first operation and the second operation.

Second Embodiment

Figure 5:
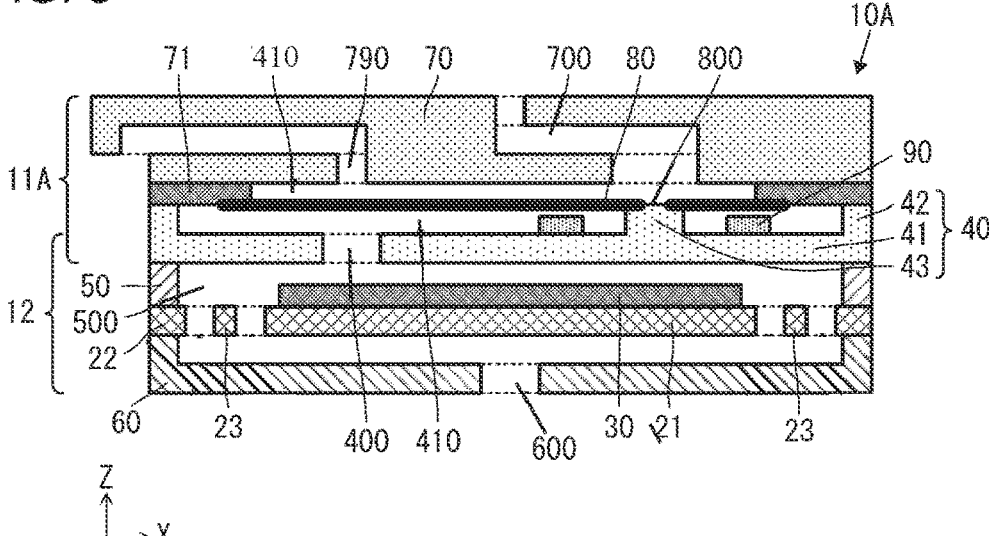
FIG. 5 is a schematic cross-sectional view, viewed from a side, of the structure of a fluid control device according to a second embodiment.

A valve and a fluid control device according to a second embodiment of the present disclosure are described with reference to the drawings. FIG. 5 is a schematic cross-sectional view, viewed from a side, of the structure of a fluid control device according to a second embodiment.

As illustrated in FIG. 5, a fluid control device 10A according to a second embodiment differs from the fluid control device 10 according to the first embodiment in the structure of a valve 11A. Other components of the fluid control device 10A are the same as those of the fluid control device 10, and thus are not redundantly described.

The fluid control device 10A includes the valve 11A. The valve 11A differs from the valve 11 according to the first embodiment in the form of the arrangement of the protrusion 90. Other components of the valve 11A are the same as those of the valve 11, and thus are not redundantly described.

The protrusion 90 is fixed to the first main surface of the flat board 41 of the housing member 40. The protrusion 90 may be integrated with the flat board 41.

As in the fluid control device 10, the fluid control device 10A with this structure can reduce the occurrence of the failures caused by the foreign substances during the first operation and the second operation.

Third Embodiment

Figure 6:
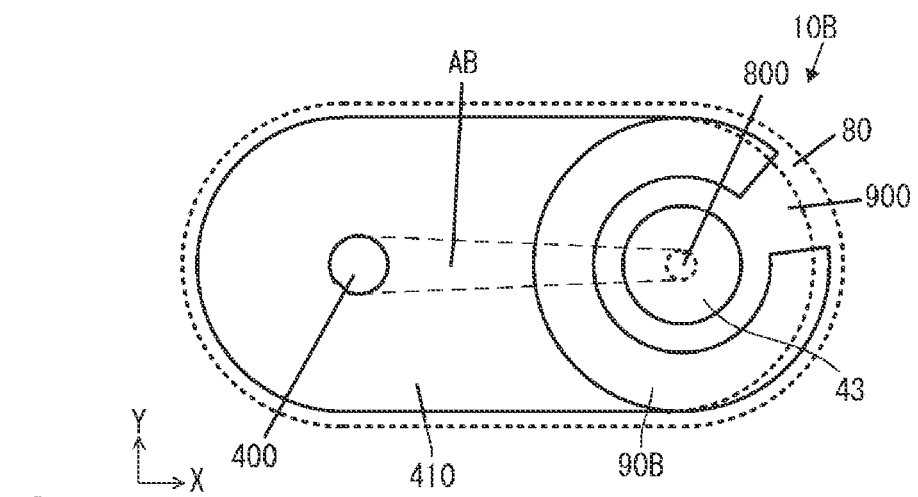
FIG. 6 is a partially enlarged plan view of the valve in a fluid control device according to a third embodiment, at a portion including a seat and a diaphragm.

A valve and a fluid control device according to a third embodiment of the present disclosure are described with reference to the drawings. FIG. 6 is a partially enlarged plan view of the valve in the fluid control device according to a third embodiment, at a portion including a seat and a diaphragm. FIG. 6 illustrates the state where the diaphragm is removed.

As illustrated in FIG. 6, the valve in a fluid control device 10B according to the third embodiment differs from the valve in the fluid control device 10 according to the first embodiment in that it includes a protrusion 90B. Other components of the valve in the fluid control device 10B are the same as those of the valve in the fluid control device 10, and thus are not redundantly described.

The valve in the fluid control device 10B includes the protrusion 90B. The protrusion 90B has a ring shape (a C ring shape) formed by cutting a part of the circumference. In other words, the protrusion 90B has a gap 900 at a part in the circumference. The protrusion 90B including the gap 900 has a structure in which the space out of the circumference and the space inside the circumference communicate with each other through the gap 900.

The protrusion 90B is disposed to allow the gap 900 not to overlap an area AB between the hole 400 and the through-hole 800. The gap 900 may be disposed opposite to the hole 400 with respect to the seat 43 in a direction (X-axis direction in FIG. 6) in which the hole 400 and the through-hole 800 and the seat 43 are arranged.

In this structure, the valve in the fluid control device 10B can prevent a decrease in the flow rate of the gas from the hole 400 to the through-hole 800 while achieving an effect (effect of trapping foreign substances) of the protrusion 90B reducing the arrival of foreign substances at the through-hole 800.

The length of the gap 900 in the peripheral direction (the opening area of the gap 900) may be set as appropriate based on, for example, an intended flow rate.

Fourth Embodiment

Figure 7:
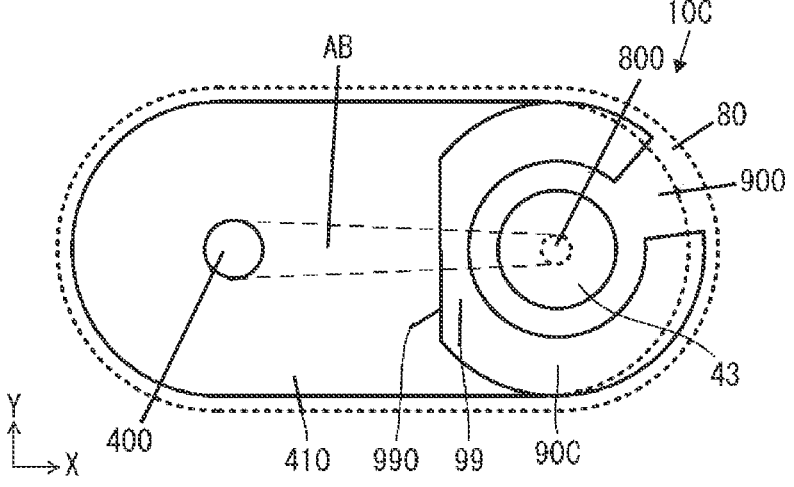
FIG. 7 is a partially enlarged plan view of a valve in a fluid control device according to a fourth embodiment, at a portion including a seat and a diaphragm.

A valve and a fluid control device according to a fourth embodiment of the present disclosure are described with reference to the drawings. FIG. 7 is a partially enlarged plan view of a valve in a fluid control device according to a fourth embodiment, at a portion including a seat and a diaphragm. FIG. 7 illustrates the state where the diaphragm is removed.

As illustrated in FIG. 7, the valve in a fluid control device 10C according to the fourth embodiment differs from the valve in the fluid control device 10B according to the third embodiment in that it includes a protrusion 90C. Other components of the valve in the fluid control device 10C are the same as those of the valve in the fluid control device 10B, and thus are not redundantly described.

The valve in the fluid control device 10C includes the protrusion 90C. The protrusion 90C differs from the protrusion 90B in that it includes a narrow portion 99. Other components of the protrusion 90C are the same as those of the protrusion 90B, and thus are not redundantly described.

The protrusion 90C includes the narrow portion 99. The narrow portion 99 is a portion where the distance between the inner surface and the outer surface is shorter than the other portion in the peripheral direction of the protrusion 90C.

The protrusion 90C is disposed in the valve chamber 410 to have the narrow portion 99 located between the hole 400 and the through-hole 800. In this structure, the valve in the fluid control device 10C can prevent a decrease in the flow rate of the gas from the hole 400 to the through-hole 800 while achieving an effect of the protrusion 90C reducing the arrival of foreign substances at the through-hole 800.

In the protrusion 90C, the narrow portion 99 has an outer surface 990 that is a flat surface. The protrusion 90C is disposed to allow the outer surface 990 to face the hole 400. In other words, the outer surface 990 is disposed perpendicular to the direction in which the hole 400 and the through-hole 800 are arranged.

Thus, the foreign substances from the hole 400 are highly likely to collide against the outer surface 990 and stay on the outer surface 990. The valve in the fluid control device 10C can thus further enhance the effect of trapping the foreign substances.

Fifth Embodiment

Figure 8A:
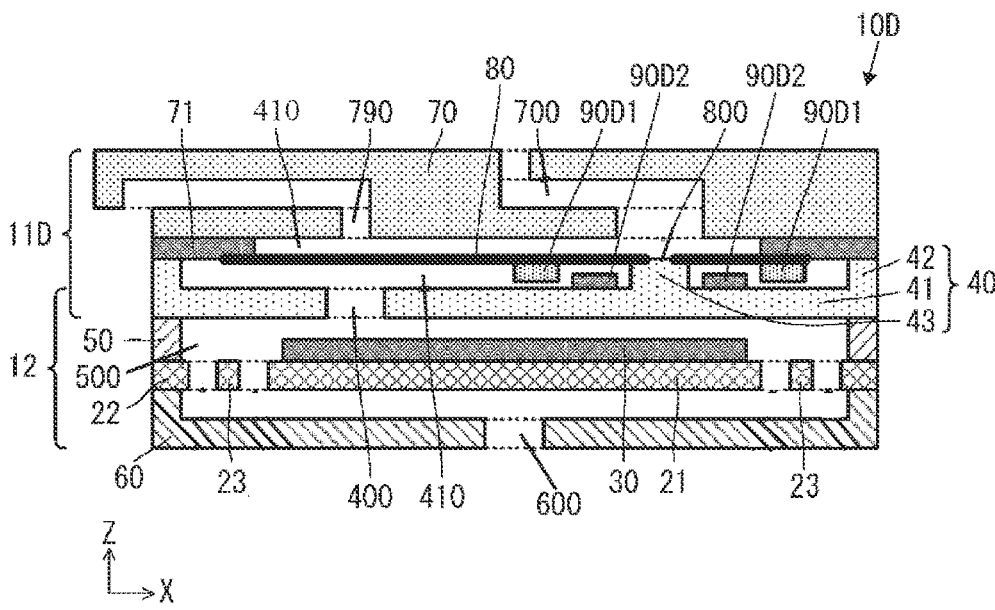
FIG. 8A is a schematic cross-sectional view, viewed from a side, of the structure of a fluid control device according to a fifth embodiment.
Figure 8B:
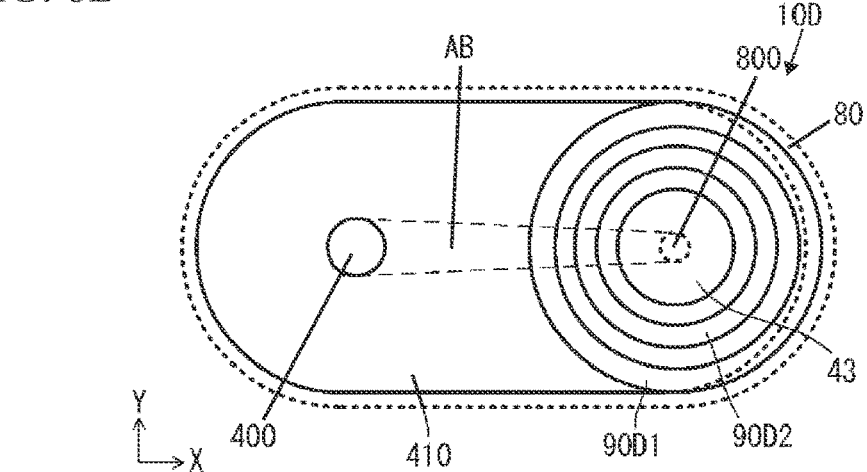
FIG. 8B is a partially enlarged plan view of a valve in a fluid control device according to a fifth embodiment, at a portion including a seat and a diaphragm.

A valve and a fluid control device according to a fifth embodiment of the present disclosure are described with reference to the drawings. FIG. 8A is a schematic cross-sectional view, viewed from a side, of the structure of a fluid control device according to a fifth embodiment, and FIG. 8B is a partially enlarged plan view of a valve in a fluid control device according to a fifth embodiment, at a portion including a seat and a diaphragm. FIG. 8B illustrates the state where the diaphragm is removed.

As illustrated in FIG. 8A and FIG. 8B, a fluid control device 10D according to the fifth embodiment differs from the fluid control device 10 according to the first embodiment in that it includes a valve 11D. Other components of the fluid control device 10D are the same as those of the fluid control device 10, and thus are not redundantly described.

The fluid control device 10D includes the valve 11D. The valve 11D differs from the valve 11 according to the first embodiment in that it includes a protrusion 90D1 and a protrusion 90D2. Other components of the valve 11D are the same as those of the valve 11, and thus are not redundantly described.

The valve 11D includes the protrusion 90D1 and the protrusion 90D2. The protrusion 90D1 and the protrusion 90D2 have a ring shape in a plan view.

The protrusion 90D2 is disposed to allow the seat 43 to overlap the center opening of the protrusion 90D2 when the valve 11D is viewed in a plan. In other words, the seat 43 is disposed within the center opening of the protrusion 90D2.

The protrusion 90D1 is disposed to allow the seat 43 and the protrusion 90D2 to overlap the center opening of the protrusion 90D1 when the valve 11D is viewed in a plan. In other words, the seat 43 and the protrusion 90D2 are disposed within the center opening of the protrusion 90D1.

The protrusion 90D1 is fixed to the diaphragm 80 and not fixed to the flat board 41 of the housing member 40. The protrusion 90D2 is fixed to the flat board 41 of the housing member 40 and not fixed to the diaphragm 80.

In this structure, two protrusions are disposed in the gas flow path, and the valve 11D can have an improved effect of trapping foreign substances. Particularly, in the valve 11D, the protrusion 90D1 and the protrusion 90D2 are fixed to different objects, and the gap from the protrusion 90D1 and the gap from the protrusion 90D2 are located at different positions in the thickness direction of the valve 11D. Thus, the valve 11D can have a further improved effect of trapping foreign substances.

Sixth Embodiment

Figure 9:
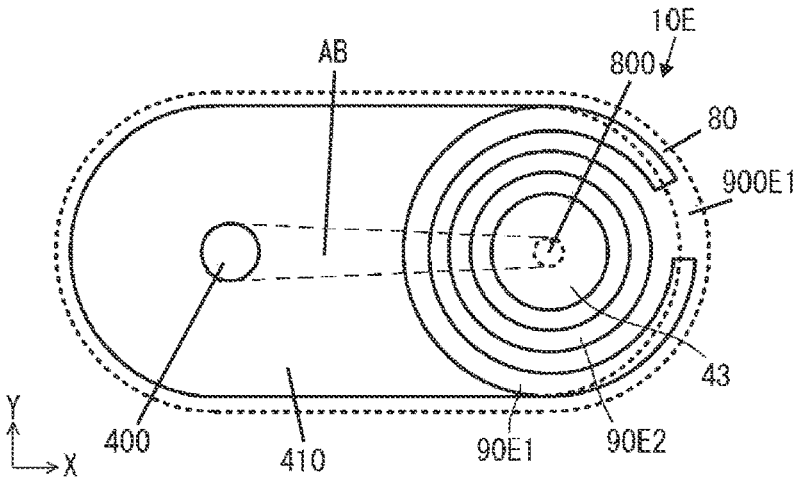
FIG. 9 is a partially enlarged plan view of a valve in a fluid control device according to a sixth embodiment, at a portion including a seat and a diaphragm.

A valve and a fluid control device according to a sixth embodiment of the present disclosure are described with reference to the drawings. FIG. 9 is a partially enlarged plan view of a valve in a fluid control device according to a sixth embodiment, at a portion including a seat and a diaphragm. FIG. 9 illustrates the state where the diaphragm is removed.

As illustrated in FIG. 9, a valve in a fluid control device 10E according to a sixth embodiment differs from the valve in the fluid control device 10D according to the fifth embodiment in that it includes a protrusion 90E1 and a protrusion 90E2. Other components of the valve in the fluid control device 10E are the same as those of the valve in the fluid control device 10D, and thus are not redundantly described.

The valve in the fluid control device 10E includes the protrusion 90E1 and the protrusion 90E2. The protrusion 90E2 is the same as the protrusion 90D2.

The protrusion 90E1 has a ring shape (a C ring shape) formed by cutting a part of the circumference. In other words, the protrusion 90E1 includes a gap 900E1 at a part of the circumference. More specifically, the protrusion 90E1 includes the same structure where the protrusion 90D1 is replaced with the protrusion 90B.

In this structure, the valve in the fluid control device 10E can prevent a decrease in the flow rate of the gas from the hole 400 to the through-hole 800 while having an improved effect of trapping foreign substances.

Seventh Embodiment

Figure 10:
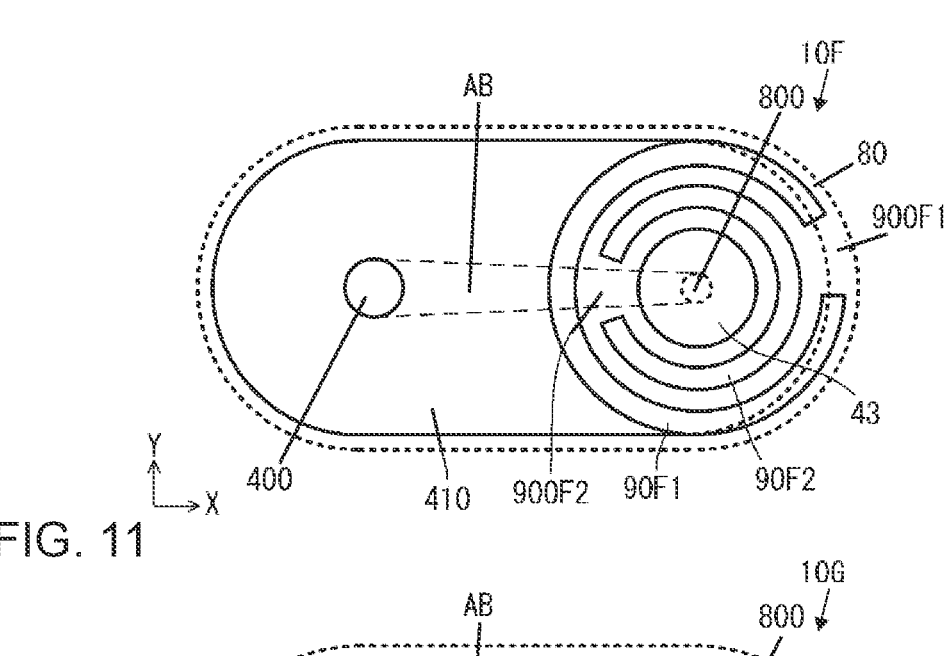
FIG. 10 is a partially enlarged plan view of a valve in a fluid control device according to a seventh embodiment, at a portion including a seat and a diaphragm.

A valve and a fluid control device according to a seventh embodiment of the present disclosure are described with reference to the drawings. FIG. 10 is a partially enlarged plan view of a valve in a fluid control device according to the seventh embodiment, at a portion including a seat and a diaphragm. FIG. 10 illustrates the state where the diaphragm is removed.

As illustrated in FIG. 10, a valve in a fluid control device 10F according to the seventh embodiment differs from the valve in the fluid control device 10E according to the sixth embodiment in that it includes a protrusion 90F1 and a protrusion 90F2. Other components of the valve in the fluid control device 10F are the same as those of the valve in the fluid control device 10E, and thus are not redundantly described.

The valve in the fluid control device 10F includes the protrusion 90F1 and the protrusion 90F2. The protrusion 90F1 has the same structure as the protrusion 90E1. The protrusion 90F1 has a gap 900F1.

As in the protrusion 90F1, the protrusion 90F2 has a ring shape (a C ring shape) formed by cutting a part of the circumference. In other words, the protrusion 90F2 includes a gap 900F2 at a part in the circumference. The protrusion 90F2 has a ring shape (a C ring shape) smaller than the protrusion 90F1, and is disposed between the protrusion 90F1 and the seat 43 in a plan view.

The gap 900F1 and the gap 900F2 do not overlap. More specifically, with respect to the seat 43, the direction in which the gap 900F1 is located differs from the direction in which the gap 900F2 is located. The direction in which the gap 900F1 is located with respect to the seat 43 and the direction in which the gap 900F2 is located with respect to the seat 43 may be spaced as far as possible with respect to the seat 43. For example, the direction in which the gap 900F1 is located with respect to the seat 43 and the direction in which the gap 900F2 is located with respect to the seat 43 may be opposite to each other as far as possible.

In this structure, the valve in the fluid control device 10F can further prevent a decrease in the flow rate of the gas from the hole 400 to the through-hole 800 while having an improved effect of trapping foreign substances.

Eighth Embodiment

Figure 11:
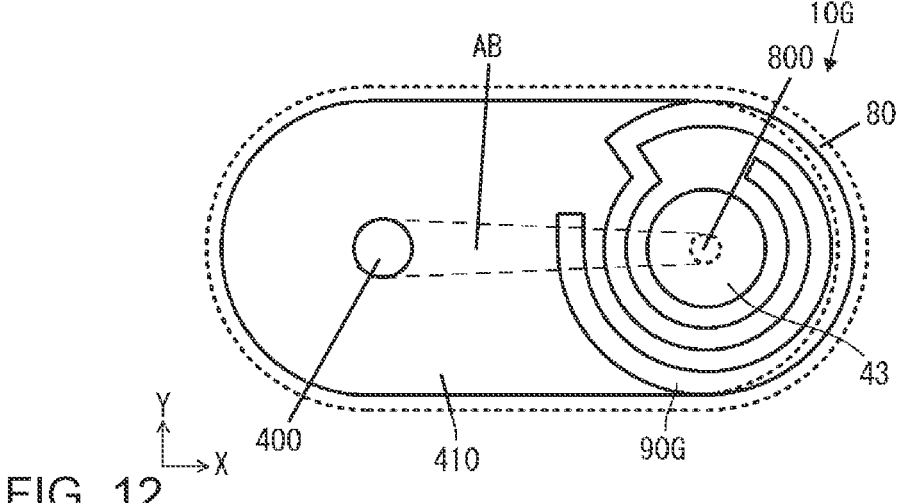
FIG. 11 is a partially enlarged plan view of a valve in a fluid control device according to an eighth embodiment, at a portion including a seat and a diaphragm.

A valve and a fluid control device according to an eighth embodiment of the present disclosure are described with reference to the drawings. FIG. 11 is a partially enlarged plan view of a valve in a fluid control device according to an eighth embodiment, at a portion including a seat and a diaphragm. FIG. 11 illustrates the state where the diaphragm is removed.

As illustrated in FIG. 11, a valve in a fluid control device 10G according to an eighth embodiment differs from the valve 11 in the fluid control device 10 according to the first embodiment in that it includes a protrusion 90G. Other components of the valve in the fluid control device 10G are the same as those of the valve 11 in the fluid control device 10, and thus are not redundantly described.

The valve in the fluid control device 10G includes the protrusion 90G. The protrusion 90G has a predetermined thickness and a two-dimensional spiral shape. The seat 43 is disposed in the spiral center opening defined by the protrusion 90G.

In this structure, a gas from the hole 400 flows in through the opening of the protrusion 90G at the outer end, spirally flows along the spiral shape of the protrusion 90G, and flows into the through-hole 800 from the opening of the protrusion 90G at the inner end.

In this structure, the valve in the fluid control device 10G can ensure a predetermined flow rate of the gas from the hole 400 to the through-hole 800 while achieving an effect of trapping foreign substances.

Ninth Embodiment

Figure 12:
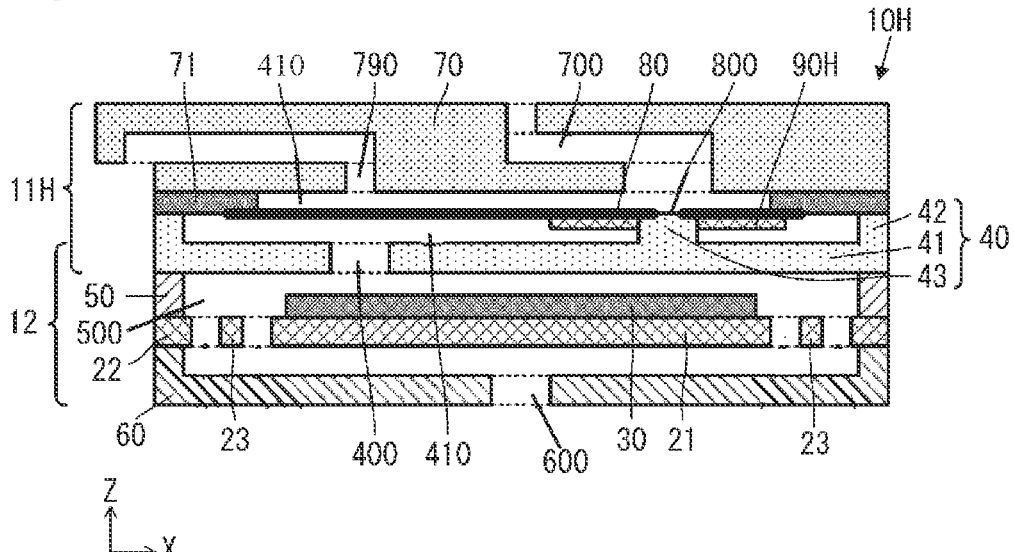
FIG. 12 is a schematic cross-sectional view, viewed from a side, of the structure of a fluid control device according to a ninth embodiment.

A valve and a fluid control device according to a ninth embodiment of the present disclosure are described with reference to the drawings. FIG. 12 is a schematic cross-sectional view, viewed from a side, of the structure of a fluid control device according to a ninth embodiment.

As illustrated in FIG. 12, a fluid control device 10H according to a ninth embodiment differs from the fluid control device 10 according to the first embodiment in that it includes a valve 11H. Other components of the fluid control device 10H are the same as those of the fluid control device 10, and thus are not redundantly described. The valve 11H differs from the valve 11 according to the first embodiment in that it includes a protrusion 90H. Other components of the valve 11H are the same as those of the valve 11, and thus are not redundantly described.

The valve 11H includes the protrusion 90H. The protrusion 90H differs from the protrusion 90 in terms of the material. The protrusion 90H is formed from a mesh material. The maximum opening in the mesh material may be smaller than or equal to the maximum opening of the through-hole 800.

In this structure, the valve in the fluid control device 10H can further prevent a decrease in the flow rate of the gas from the hole 400 to the through-hole 800 while having an improved effect of trapping foreign substances.

In the valve 11H, the protrusion 90H does not cover the through-hole 800. Instead, the protrusion 90H may cover the through-hole 800. In this case, at least the portion overlapping the through-hole 800 is formed simply from a mesh that communicates with the through-hole 800 in the thickness direction. Thus, the valve 11H can reduce an inflow of the gas from the through-hole 800 also when discharging the gas from the cuff 2.

Tenth Embodiment

Figure 13A:
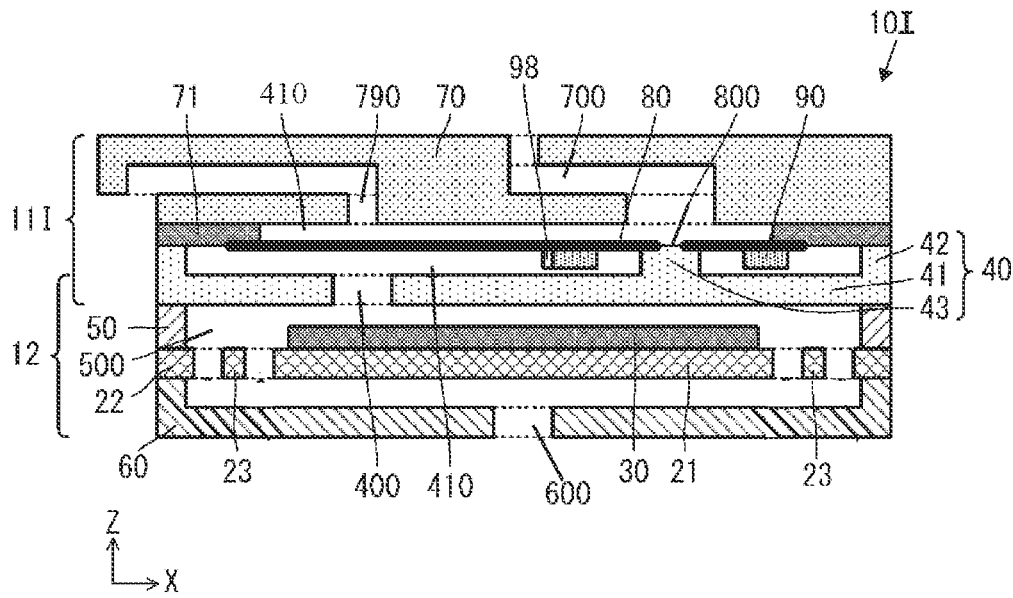
FIG. 13A is a schematic cross-sectional view, viewed from a side, of the structure of a fluid control device according to a tenth embodiment.
Figure 13B:
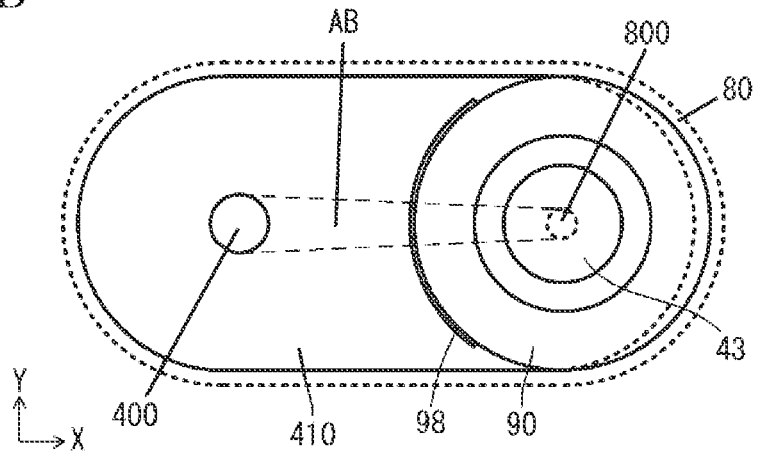
FIG. 13B is a partially enlarged plan view of a valve in the fluid control device according to the tenth embodiment, at a portion including a seat and a diaphragm.

A valve and a fluid control device according to a tenth embodiment of the present disclosure are described with reference to the drawings. FIG. 13A is a schematic cross-sectional view, viewed from a side, of the structure of a fluid control device according to a tenth embodiment. FIG. 13B is a partially enlarged plan view of a valve in the fluid control device according to the tenth embodiment, at a portion including a seat and a diaphragm. FIG. 13B illustrates the state where the diaphragm is removed.

As illustrated in FIG. 13A and FIG. 13B, a fluid control device 10I according to the tenth embodiment differs from the fluid control device 10 according to the first embodiment in that it includes a valve 11I. Other components of the fluid control device 10I are the same as those of the fluid control device 10, and thus are not redundantly described. The valve 11I differs from the valve 11 according to the first embodiment in that it includes an adhesive layer 98. Other components of the valve 11I are the same as those of the valve 11, and thus are not redundantly described.

The adhesive layer 98 is disposed on the outer surface of the protrusion 90. More specifically, the adhesive layer 98 is disposed in an area on the outer surface of the protrusion 90 nearer the hole 400 than the seat 43 and the through-hole 800.

In this structure, the foreign substances from the hole 400 are attracted by the adhesive layer 98. Thus, the valve in the fluid control device 10I can have an improved effect of trapping the foreign substances.

Instead of the above example, the adhesive layer 98 may be disposed on, for example, the entire outer peripheral surface of the protrusion 90, the surface that comes into contact with the diaphragm 80 and its opposite surface, any of inner main surfaces, and a combination of any two or more of these surfaces.

The components in the above embodiments may be combined as appropriate, and each combination of the components can exert the corresponding operational effects.

<1> A valve, comprising: a housing that includes a first wall and a second wall that oppose each other, and a side wall connected to the first wall and the second wall, the side wall being capable of defining a valve chamber together with the first wall and the second wall; a first hole that is formed in the first wall, and that connects the valve chamber and an outside to each other; a second hole that is formed in the second wall, and that connects the valve chamber and an outside to each other; a diaphragm that divides the valve chamber into a first space nearer the first wall and a second space nearer the second wall, and that has a through-hole that allows the first space and the second space to communicate with each other; a seat that protrudes into the valve chamber from the first wall, and that is disposed to overlap the through-hole when the valve is viewed in a plan in a first direction, or viewed from the first wall to the second wall; and a protrusion that is disposed between the first hole and the seat when the valve is viewed, in a cross section, in a second direction perpendicular to the first direction, and that is disposed on the diaphragm or the first wall in the first space.

<2> The valve according to <1>, wherein the protrusion is disposed in a ring shape to surround the seat when viewed in a plan in the first direction.

<3> The valve according to <2>, wherein the protrusion has an entirely continuous circumference.

<4> The valve according to <2>, wherein the protrusion has a circumference having a gap at a part.

<5> The valve according to <4>, wherein the gap is located at a position different from a position between the first hole and the seat when the valve is viewed, in a cross section, from a side in the second direction.

<6> The valve according to any one of <1> to <5>, wherein the protrusion includes a first protrusion disposed on the diaphragm, and a second protrusion disposed on the first wall.

<7> The valve according to <5>, wherein the protrusion includes a first protrusion disposed on the diaphragm, and a second protrusion disposed on the first wall, and wherein a gap of the first protrusion and a gap of the second protrusion are located at different positions when viewed in a plan in the first direction.

<8> The valve according to <1>, wherein the protrusion has a two-dimensional spiral shape.

<9> The valve according to any one of <1> to <8>, wherein a surface of the protrusion has adhesion.

<10> The valve according to any one of <1> to <9>, wherein the protrusion has a mesh shape.

<11> The valve according to any one of <1> to <10>, wherein a distance between the protrusion disposed on the first wall and the diaphragm is smaller than maximum dimensions of the protrusion and the through-hole.

<12> The valve according to any one of <1> to <10>, wherein a distance between the protrusion disposed on the diaphragm and the first wall is smaller than a maximum dimension of the through-hole.

<13> The valve according to any one of <1> to <12>, wherein a dimension of the protrusion in the first direction is smaller than a dimension of the seat in the first direction.

<14> A fluid control device, comprising: the valve according to any one of <1> to <13>; and a pump having a pump chamber that communicates with the first hole.

10, 10A, 10B, 10C, 10D, 10E, 10F, 10G, 10H, 10I fluid control device
11, 11A, 11D, 11H, 11I valve
12 pump
21 main flat board
22 frame
23 coupling member
30 piezoelectric device
40 housing member
41 flat board
42 side wall
43 seat
50 side wall member
60 lid member
70 housing member
71 retainer plate
80 diaphragm
90, 90B, 90C, 90D1, 90D2, 90E1, 90E2, 90F1, 90F2, 90G, 90H protrusion
98 adhesive layer
99 narrow portion
400, 600, 700, 790 hole
410 valve chamber
500 hollow
800 through-hole
990 outer surface

The invention claimed is:

1. A valve, comprising:
a housing including a first wall and a second wall opposing to each other, and a side wall connected to the first wall and the second wall, the side wall being capable of defining a valve chamber together with the first wall and the second wall;
a first hole provided in the first wall, and connecting the valve chamber and an outside to each other;
a second hole provided in the second wall, and connecting the valve chamber and an outside to each other;
a diaphragm dividing the valve chamber into a first space nearer the first wall and a second space nearer the second wall, and having a through-hole allowing the first space and the second space to communicate with each other;
a seat protruding into the valve chamber from the first wall, and disposed to overlap the through-hole when the valve is viewed in a plan in a first direction, or viewed from the first wall to the second wall; and
a protrusion disposed between the first hole and the seat when the valve is viewed, in a cross section, in a second direction perpendicular to the first direction, and disposed on the diaphragm or the first wall in the first space.

2. The valve according to claim 1,
wherein the protrusion includes
a first protrusion disposed on the diaphragm, and
a second protrusion disposed on the first wall.

3. The valve according to claim 1,
wherein the protrusion has a two-dimensional spiral shape.

4. The valve according to claim 1,
wherein a surface of the protrusion has adhesion.

5. The valve according to claim 1,
wherein the protrusion has a mesh shape.

6. The valve according to claim 1,
wherein a distance between the protrusion disposed on the first wall and the diaphragm is shorter than a maximum dimension of the through-hole.

7. The valve according to claim 1,
wherein a distance between the protrusion disposed on the diaphragm and the first wall is shorter than a maximum dimension of the through-hole.

8. The valve according to claim 1,
wherein a dimension of the protrusion in the first direction is shorter than a dimension of the seat in the first direction.

9. A fluid control device, comprising:
the valve according to claim 1; and
a pump having a pump chamber communicating with the first hole.

10. The valve according to claim 1,
wherein the protrusion is disposed in a ring shape to surround the seat when viewed in a plan in the first direction.

11. The valve according to claim 10,
wherein the protrusion includes
a first protrusion disposed on the diaphragm, and
a second protrusion disposed on the first wall.

12. The valve according to claim 10,
wherein a surface of the protrusion has adhesion.

13. The valve according to claim 10,
wherein the protrusion has an entirely continuous circumference.

14. The valve according to claim 13,
wherein the protrusion includes
a first protrusion disposed on the diaphragm, and
a second protrusion disposed on the first wall.

15. The valve according to claim 13,
wherein a surface of the protrusion has adhesion.

16. The valve according to claim 10,
wherein the protrusion has a circumference having a gap at a part.

17. The valve according to claim 16,
wherein the protrusion includes
a first protrusion disposed on the diaphragm, and
a second protrusion disposed on the first wall.

18. The valve according to claim 16,
wherein the gap is located at a position different from a position between the first hole and the seat when the valve is viewed, in a cross section, from a side in the second direction.

19. The valve according to claim 18,
wherein the protrusion includes
a first protrusion disposed on the diaphragm, and
a second protrusion disposed on the first wall, and
wherein the gap includes a first gap of the first protrusion and a second gap of the second protrusion, and the first gap and the second gap are located at different positions when viewed in a plan in the first direction.

20. The valve according to claim 18,
wherein the protrusion includes
a first protrusion disposed on the diaphragm, and
a second protrusion disposed on the first wall.

\* \* \* \* \*